(12) United States Patent
Hilton et al.

(10) Patent No.: US 10,268,622 B2
(45) Date of Patent: Apr. 23, 2019

(54) SYSTEMS AND METHODS FOR INCREASING ANALOG PROCESSOR CONNECTIVITY

(71) Applicant: D-Wave Systems Inc., Burnaby (CA)

(72) Inventors: Jeremy P. Hilton, Burnaby (CA); Aidan Patrick Roy, Surrey (CA); Paul I. Bunyk, Vancouver (CA); Andrew Douglas King, Vancouver (CA); Kelly T. R. Boothby, Coquitlam (CA); Richard G. Harris, North Vancouver (CA); Chunqing Deng, Coquitlam (CA)

(73) Assignee: D-WAVE SYSTEMS INC., Burnaby (CA)

(*) Notice: Subject to any disclaimer, the term of this patent is extended or adjusted under 35 U.S.C. 154(b) by 73 days.

(21) Appl. No.: 15/418,497

(22) Filed: Jan. 27, 2017

(65) Prior Publication Data
US 2017/0220510 A1    Aug. 3, 2017

Related U.S. Application Data

(60) Provisional application No. 62/288,719, filed on Jan. 29, 2016.

(51) Int. Cl.
*G06F 13/40* (2006.01)
*G06F 13/36* (2006.01)
*G06N 99/00* (2019.01)

(52) U.S. Cl.
CPC .......... *G06F 13/4068* (2013.01); *G06F 13/36* (2013.01); *G06N 99/002* (2013.01)

(58) Field of Classification Search
None
See application file for complete search history.

(56) References Cited

U.S. PATENT DOCUMENTS

| | | | |
|---|---|---|---|
| 6,996,504 B2 | 2/2006 | Novotny et al. | |
| 8,063,657 B2 | 11/2011 | Rose | |
| 8,164,082 B2 | 4/2012 | Friesen | |
| 8,174,305 B2 | 5/2012 | Harris | |
| 8,190,553 B2 | 5/2012 | Routt | |
| 8,772,759 B2 | 7/2014 | Bunyk et al. | |
| 9,059,674 B2 | 6/2015 | Chow et al. | |
| 2006/0097746 A1* | 5/2006 | Amin | B82Y 10/00 326/6 |

(Continued)

*Primary Examiner* — Henry Tsai
*Assistant Examiner* — Aurangzeb Hassan
(74) *Attorney, Agent, or Firm* — Cozen O'Connor

(57) ABSTRACT

Topologies for analog computing systems are provided. Qubits in the topology are grouped into cells, and cells are coupled to adjacent cells by inter-cell couplers. At least some cells are coupled to non-adjacent cells via long-range couplers. Long-range couplers may be arranged into coverings so that certain sets of qubits within a covering region may be coupled with a reduced number of couplers. Each cell within a covering region without a long-range coupler may be proximate to a cell with a long range coupler so that each cell within the covering region is no more than a certain coupling distance away from a long-range coupler. Long-range couplers may couple over a greater physical distance than inter-cell couplers. Long-range couplers may couple to qubits over a larger coupling region, and may extend across multiple crossing regions between qubits.

34 Claims, 8 Drawing Sheets

(56) References Cited

U.S. PATENT DOCUMENTS

| | | | |
|---|---|---|---|
| 2006/0097747 A1* | 5/2006 | Amin | B82Y 10/00 326/6 |
| 2013/0005580 A1* | 1/2013 | Bunyk | B82Y 10/00 505/170 |
| 2014/0097405 A1* | 4/2014 | Bunyk | G06N 99/002 257/31 |
| 2015/0032994 A1 | 1/2015 | Chudak et al. | |
| 2015/0046681 A1* | 2/2015 | King | G06N 99/002 712/42 |
| 2016/0335558 A1 | 11/2016 | Bunyk et al. | |

* cited by examiner

SYSTEMS AND METHODS FOR INCREASING ANALOG PROCESSOR CONNECTIVITY

TECHNICAL FIELD

This disclosure generally relates to analog computing and analog processors (e.g., quantum computing and quantum processors). Particular aspects relate to topologies for analog processors.

BACKGROUND

At least some analog processors (e.g., quantum processors) provide a plurality of analog computation devices (e.g., qubits) which are controllably coupled to each other by couplers. Problems may be "embedded" on the processor for computation (e.g., by representing the problems as graphs where nodes and edges correspond to computation devices and couplers, respectively). An ideal analog processor of this type would generally allow for direct couplings between any two qubits, but in practice the number of physical couplers provided by the processor is often limited.

Two qubits which do not share a physical coupler may, in some circumstances, be coupled by other techniques. See, for example, U.S. Pat. No. 8,174,305 to Harris. However, these techniques can consume additional computational resources and thus constrain the scope of the problems which may be computed, reduce the accuracy of the results, require additional hardware and/or software, and/or require more time for computation. The degree to which such techniques require such resources for a particular computation will generally depend on how closely that computation maps to the hardware.

Accordingly, the design and selection of an analog processor's topology—that is, the arrangement of computation devices and couplers—is an important aspect of analog processor design. Particular topologies may be better-suited to solving certain classes of problem than others, due to the particular graph formed by their computation devices and couplers (along with, potentially, other factors). For an example of analog processor topologies, see U.S. Pat. No. 8,772,759 to Bunyk et al.

There is thus a general desire for an analog processor topology which permits coupling between arbitrary pairs of qubits with reduced computational overhead in at least some circumstances.

The foregoing examples of the related art and limitations related thereto are intended to be illustrative and not exclusive. Other limitations of the related art will become apparent to those of skill in the art upon a reading of the specification and a study of the drawings.

SUMMARY

The following implementations and embodiments and aspects thereof are described and illustrated in conjunction with systems, tools and methods which are meant to be exemplary and illustrative, not limiting in scope. In various implementations and embodiments, one or more of the above-described problems have been reduced or eliminated, while other implementations or embodiments are directed to other improvements.

One aspect of the invention provides a quantum processor comprising a plurality of cells, each cell comprising one or more qubits. The quantum processor further comprises one or more inter-cell couplers and a long-range coupler. Each inter-cell coupler provides controllable communicative coupling between a first inter-cell coupling qubit of the one or more qubits to a second inter-cell coupling qubit of another cell. Direct coupling by the inter-cell couplers define an adjacency relationship between the cells of the first and second inter-cell coupling qubits. The long-range coupler provides controllable communicative coupling between a first qubit of a first cell and a second qubit of a second cell, the second cell non-adjacent to the first cell.

In some embodiments, each inter-cell coupler of the first cell provides controllable communicative coupling over at most a threshold inter-cell coupling distance and the long-range coupler provides controllable communicative coupling over at least a threshold long-range coupling distance. The long-range coupling distance may be greater than the inter-cell coupling distance. In some embodiments, the long-range coupling distance is at least twice the inter-cell coupling distance. In some embodiments, the long-range coupling distance is at least six times the inter-cell coupling distance. In some embodiments, the long-range coupler passes through one or more intervening cells disposed between the first and second cells and the long-range coupler is isolated from the qubits of the intervening cells so that the long-range coupler does not couple the first qubit to any of the intervening qubits.

In some embodiments, for at least the first cell, each of the one or more inter-cell couplers couples to the respective first inter-cell coupling qubit at one or more inter-cell coupling regions. Each inter-cell coupling region may have at most an inter-cell coupling area. The long-range coupler may couple to the first qubit over a long-range coupling region having at least a long-range coupling area. The long-range coupling area may be greater than the inter-cell coupling area.

In some embodiments, for at least the first cell, each of the one or more intra-cell couplers couples to the corresponding pair of qubits at one or more intra-cell coupling regions. Each intra-cell coupling region has at most an intra-cell coupling area. The long-range coupler may couple to the first qubit over a long-range coupling region and the long-range coupling region may extend across at least a part of each of a plurality of crossing regions of the first qubit.

In some embodiments, each qubit in the first and second subsets comprises a qubit loop formed by a closed superconducting current path and a compound Josephson junction that interrupts the qubit loop. In some embodiments, each qubit in a first qubit subset of the one or more qubits crosses a portion of each qubit in a second qubit subset of the one or more qubits at a crossing region and each intra-cell coupler provides controllable communicative coupling between a first intra-cell coupling qubit of the first qubit subset and a second intra-cell coupling qubit of the second qubit at the corresponding intra-cell coupling region. The intra-cell coupling region may be proximate to the crossing region. The first qubit may be in the first qubit subset. In some embodiments, the long-range coupler does not extend across the respective crossing region of any one of the plurality of intra-cell couplers.

In some embodiments, the plurality of intra-cell couplers couple each qubit of the first qubit subset to at least one qubit of the second qubit subset and the plurality of intra-cell couplers couple each qubit of the second qubit subset to at least one qubit of the first qubit subset.

In some embodiments, the long-range coupling region comprises a first coupling region and a second coupling region, each coupling region coupled to the first qubit. At least one intra-cell coupling region may be disposed between the first and second coupling regions. The long-range coupler may pass around the at least one intra-cell coupling region without coupling to the first qubit at the intra-cell coupling region. The long-range coupler may communicatively couple the first and second coupling regions.

In some embodiments, the first cell comprises a grid of qubits, with the qubits of the first qubit subset extending substantially parallel to a first major axis and the qubits of the second qubit subset extending substantially parallel to a second major axis substantially orthogonal to the first major axis. Each of the first and second qubit subsets may comprise at least four qubits. The first qubit may extend parallel to the major axis of the first qubit for a qubit length distance. The long-range coupling region may extend parallel to the major axis of the first qubit for a coupling length distance which is at least half the qubit length distance. In some embodiments, each of the first and second qubit subsets comprise at least six qubits and the coupling length distance is at least two-thirds the qubit length distance.

In some embodiments, the first cell comprises one or more intra-subset couplers. Each intra-subset coupler provides controllable communicative coupling between at least two qubits of the first qubit subset which do not share a crossing region. In some embodiments, the one or more intra-subset couplers are disposed proximate to an outer boundary of the first cell.

In some embodiments, the long-range coupler is one of one or more long-range couplers, the first and second cells are each one of one or more long-range cells, and each of the one or more long-range cells has a respective long-range qubit coupled to at least one of the one or more long-range couplers. In some embodiments, the one or more long-range couplers comprise at least two long-range couplers and a plurality of the one or more long-range couplers couple a plurality of qubits of the first cell to a plurality of qubits of the second cell.

In some embodiments, the plurality of cells comprise one or more local cells and no qubit of the one or more local cells directly couples to any of the one or more long-range couplers. In some embodiments, each cell of the one or more local cells has a greater number of intra-cell couplers than each of the long-range cells.

In some embodiments, each pair of the plurality of cells has a corresponding coupling distance based on a number of needed to form a coupling between the pair and each of the one or more local cells is no more than a threshold coupling distance from one of the one or more long-range cells.

In some embodiments, the one or more local cells comprise a first local cell adjacent to the first cell and a second local cell adjacent to the second cell. The first and second local cells may have a corresponding inter-cell coupling distance based on a number of inter-cell couplers needed to form a coupling between the first and second local cells without the use of any of the one or more long-range couplers. The inter-cell coupling distance may be greater than the coupling distance corresponding to the first and second local cells. The coupling distance may be based at least partially on the provision of the one or more long-range couplers.

In some embodiments, the one or more long-range cells comprise a plurality of long-range subsets of cells. Each cell of each long-range subset may be coupled to each other cell of the same long-range subset via the one or more long-range couplers without the use of the one or more inter-cell couplers. Each long-range subset may have a corresponding covering density value and a corresponding covering region. For each long-range subset, each of the one or more local cells in the covering region may have a coupling distance no greater than the covering density value with at least one cell of the long-range subset. In some embodiments, each of the plurality of long-range subsets have the same corresponding covering density value.

In some embodiments, for each long-range subset, each of the one or more long-range cells of each other long-range subset in the covering region has a coupling distance no greater than the covering density value with at least one cell of the long-range subset. In some embodiments, for each long-range subset, the covering region comprises each of the plurality of cells not on a perimeter of the plurality of cells. In some embodiments, each long-range subset has the same corresponding covering region and each of the one or more local cells in the covering region is adjacent to at least one of the one or more long-range cells. In some embodiments, a first long-range subset and a second long-range subset overlap, so that at least one of the plurality of cells is contained by both the covering region of the first long-range subset and the covering region of the second long-range subset.

In some embodiments, the plurality of cells comprises a substantially two-dimensional grid of cells arranging the plurality of cells into rows and columns along first and second grid axes. Adjacent cells may be adjacent in the grid. Each long-range subset may comprise a two-dimensional sub-grid of long-range cells. In some embodiments, the grid comprises a first dimension of at least a first number of cells along the first grid axis and at least one sub-grid of long-range cells comprises a second dimension of no more than a second number of cells along the first grid axis. The second number may be no more than half the first number. In some embodiments, the grid's first dimension is at least 21 cells and the sub-grid's second dimension is no more than 5 cells.

Another aspect of the invention provides a method of controllably coupling a plurality of qubits in a quantum processor. The quantum processor comprises a plurality of cells each comprising one or more qubits. The method comprises controllably communicatively coupling a first inter-cell coupling qubit of the first cell to a second inter-cell coupling qubit of another cell via one or more inter-cell couplers. Direct coupling by the inter-cell couplers defines an adjacency relationship between the cells of the first and second inter-cell coupling qubits. The method further comprises controllably communicatively coupling a first qubit of the first cell and a second qubit of a second cell via a long-range coupler. The second cell is non-adjacent to the first cell. Some embodiments of the method involve controllably coupling a plurality of qubits in at least some of the embodiments of quantum processors described above.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Figure 1A:
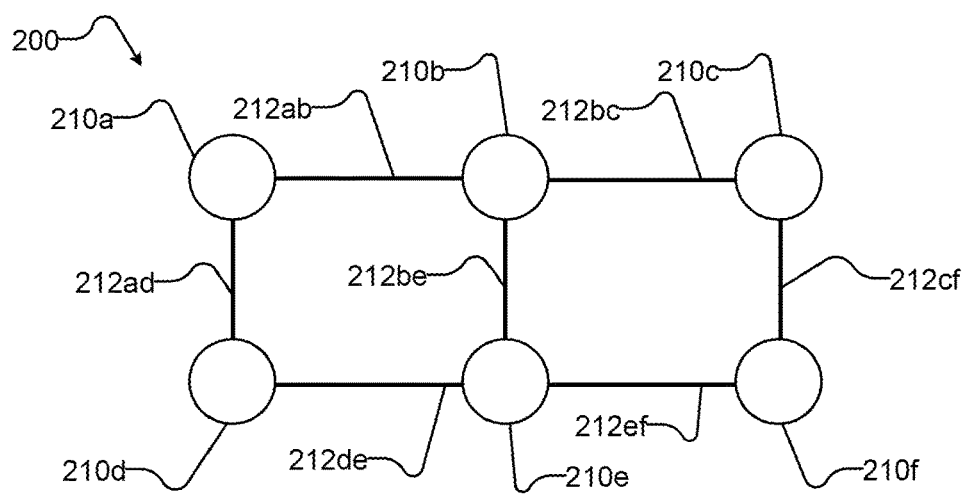
FIG. 1A shows a schematic view of a quantum processor topology comprising cells of qubits coupled by inter-cell couplers.

In the following description, some specific details are included to provide a thorough understanding of various disclosed embodiments. One skilled in the relevant art, however, will recognize that various implementations or embodiments may be practiced without one or more of these specific details, or with other methods, components, materials, etc. In other instances, well-known structures associated with quantum processors, such as quantum devices, couplers, and control systems including microprocessors and drive circuitry have not been shown or described in detail to avoid unnecessarily obscuring descriptions of the implementations or embodiments of the present apparatus and methods. Throughout this specification and the appended claims, the words "element" and "elements" are used to encompass, but are not limited to, all such structures, systems, and devices associated with quantum processors, as well as their related programmable parameters.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" "an embodiment", "another embodiment", "one example", "an example", or "another example" means that a particular referent feature, structure, or characteristic described in connection with the embodiment or example is included in at least one embodiment or example. Thus, the appearances of the phrases "in one embodiment", "in an embodiment", "another embodiment" or the like in various places throughout this specification are not necessarily all referring to the same embodiment or example. Furthermore, the particular features, structures, or characteristics may be combined in any suitable manner in one or more embodiments or examples.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors. It should also be noted that the term "or" is generally employed in its sense including "and/or" unless the content clearly dictates otherwise.

The various implementations described herein provide techniques for improving the connectivity of analog computing systems, and particularly of quantum computing systems. Such systems include computing systems previously associated with gate model quantum computing, quantum annealing, and/or adiabatic quantum computing. One technique is to provide long-range couplers between non-adjacent qubits in the processor topology (which would ordinarily require the use of several intervening qubits and/or couplers to be communicatively coupled together). Unless expressly indicated otherwise, as used herein and in the claims, the terms couple, couples, coupling and variations of such means direct or indirect communicative coupling or communications between two or more components. In some implementations, the processor topology is arranged into a plurality of subtopologies, with each subtopology comprising one or more qubits. These subtopologies are referred to herein as "cells". Cells are coupled to adjacent cells by inter-cell couplers, and some cells are coupled to non-adjacent cells via long-range couplers. Each cell without a long-range coupler may be proximate to a cell with a long range coupler. Long-range couplers may be arranged into coverings so that only a relatively small number of inter-cell couplers need to be used to couple any two qubits in the processor. Long-range couplers may directly couple over a greater physical distance than inter-cell couplers, and so may communicatively couple with qubits in a way which provides greater coupling strength. The following disclosure describes these and other implementations in greater detail.

For convenience, this disclosure will generally refer to "quantum processors" and "qubits", although it will be understood that the teachings of this disclosure may be applicable to non-quantum analog processors as well. Elements of a quantum processor may be programmable, including (for example) the qubits, couplers, and/or other devices. A quantum processor may be in communication with one or more classical computers, which may program elements of the quantum processors. For example, qubits, couplers, and/or other devices may be superconducting and may have tunable inductance, which may be controlled by one or more classical computers to model a problem. The one or more classical computers may be used to implement quantum annealing on the quantum processor. For further examples of quantum processors and of quantum-classical hybrid computing systems, see U.S. patent application Ser. No. 14/691,268 to Bunyk et. al.

FIG. 1A shows an example quantum processor topology 200. Topology 200 comprises cells 210a, 210b, 210c, 210d, 210e, 210e (collectively and individually, "cells 210") coupled by inter-cell couplers 212ab, 212bc, 212ad, 212be, 212cf, 212de, 212ef (collectively and individually, "inter-cell couplers 212" or simply "couplers 212").

Figure 1B:
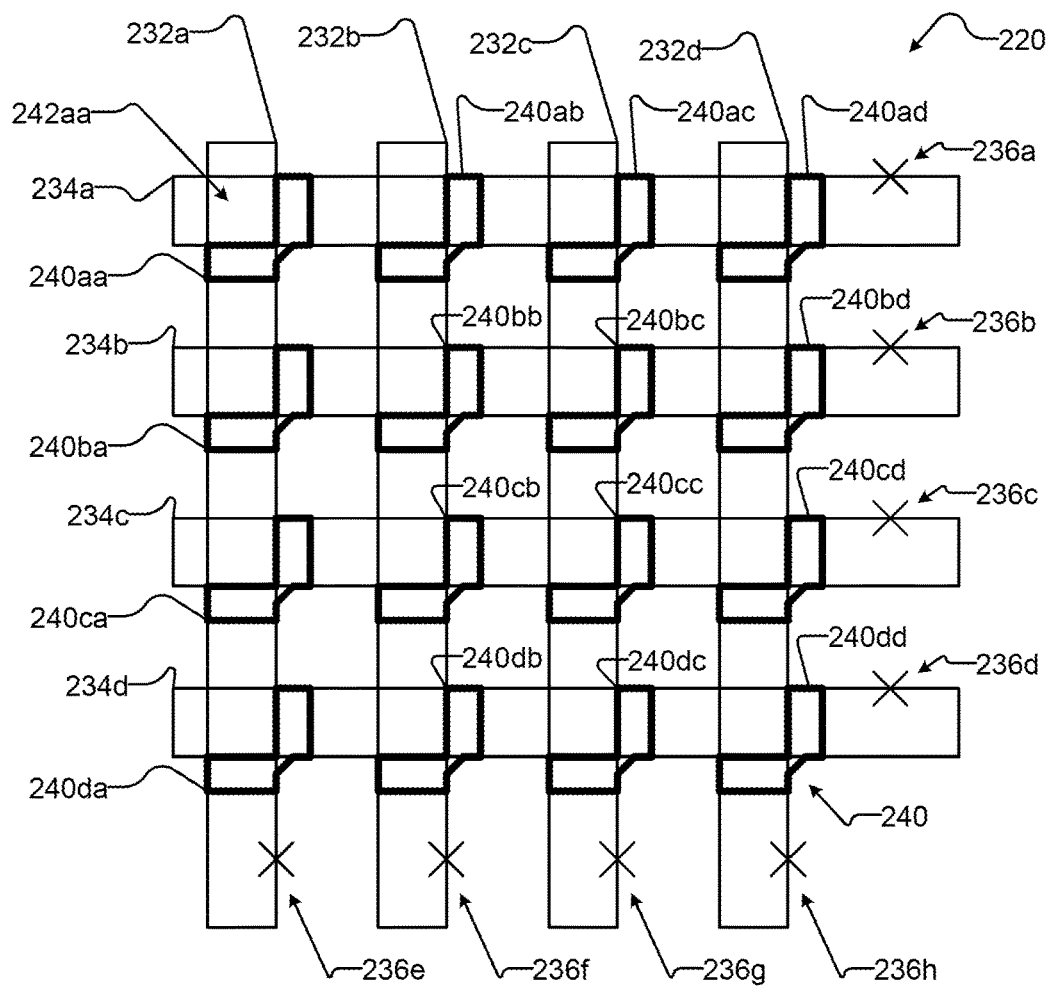
FIG. 1B shows a schematic view of an example cell of qubits.
Figure 1C:
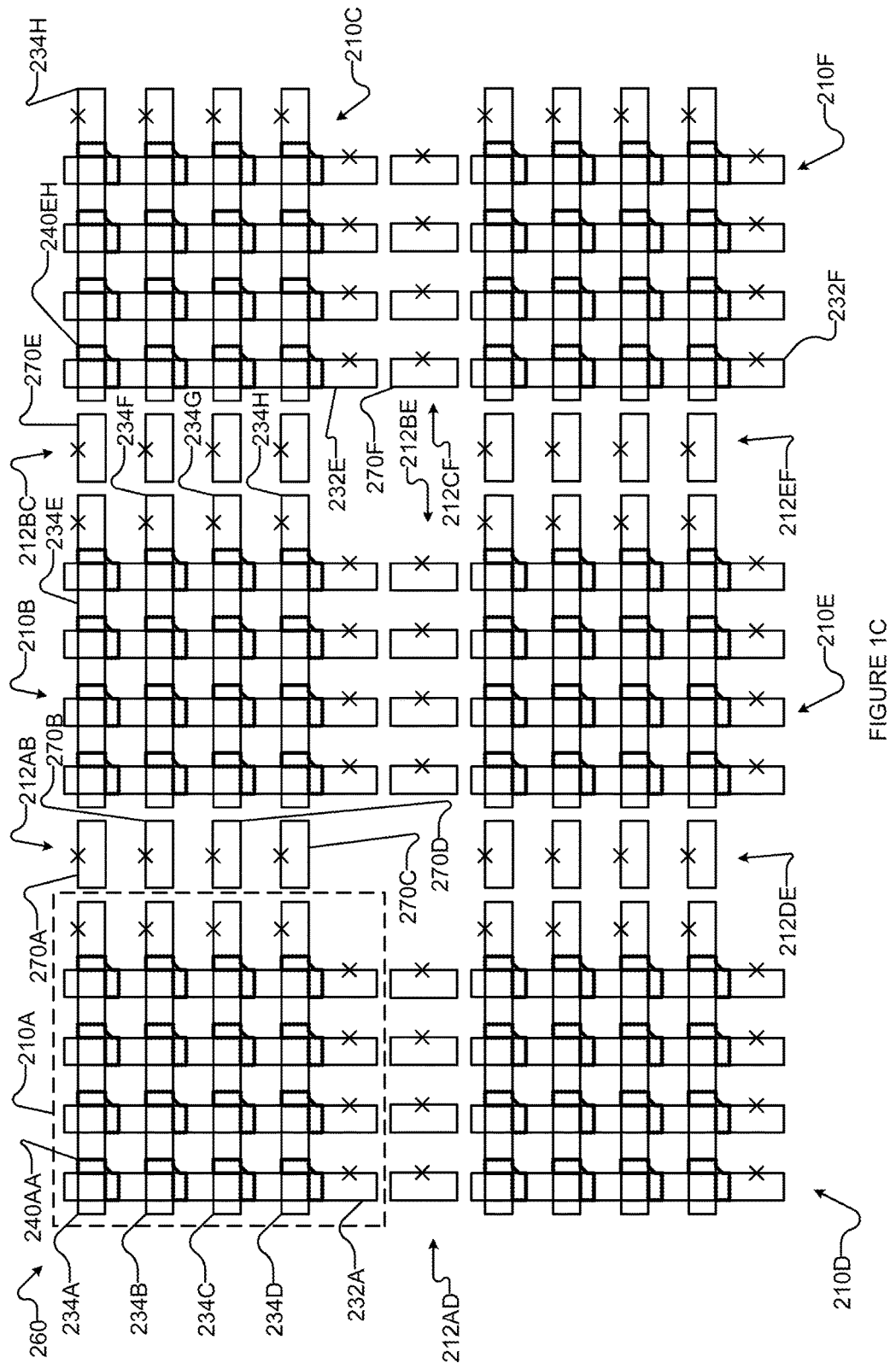
FIG. 1C shows a schematic view of an example quantum processor topology according to FIG. 1A implemented with the cell of FIG. 1B.

Each cell 210 comprises one or more qubits (e.g. as shown in FIGS. 1B and 1C). The qubits of a cell 210 may be coupled to each other by intra-cell couplers (not shown in FIG. 1A), thereby forming a subtoplogy of topology 200. In some implementations, the intra-cell connectivity of a cell 210 is greater than the connectivity of the inter-cell connectivity of toplogy 200—that is, a qubit of a given cell 210 may couple to more qubits than given cell 210 couples to other cells 210.

Each inter-cell coupler 212 between first and second cells 210 comprises one or more couplers between qubits of first and second cells 210. That is, although couplers 212 are each shown as a single line in the high-level view of FIG. 1A, each coupler 212 may comprise a plurality of physically distinct couplers. For instance, a coupler of inter-cell coupler 212ab may couple a first qubit of cell 210a to a second qubit of cell 210b. A different coupler of inter-cell coupler 212ab may couple a third qubit of cell 210a to a fourth qubit of cell 210b. Cells which are directly coupled by inter-cell couplers 212 are said to be "adjacent"—for instance, in the depicted example, cells 210a and 210b are adjacent, but cells 210a and 210c are not adjacent.

In some implementations, it is possible to couple qubits in non-adjacent cells. For instance, a qubit in cell 210a may couple to a qubit in cell 210b. The qubit in cell 210b may also couple to a qubit in cell 210c, thereby indirectly coupling qubits in cells 210a and 210c to each other. In this example, this technique uses at least two inter-cell couplers and at least one additional qubit (the qubit in cell 210b) in order to complete the coupling between the qubits of cells 210a and 210c. Additional couplers and qubits may be required to complete the coupling, depending on the subtopologies of cells 210. Establishing couplings between qubits in, for example, cells 210a and 210f may require further resources. In general, the amount of resources required to couple qubits in non-adjacent cells tends to increase as the coupling distance between the non-adjacent cells increases. The coupling distance may be measured by the number of couplers (e.g. intra-cell couplers 210) required to complete a coupling between the cells, which does not necessarily correspond to physical distance between the physical structures of cells 210 on a processor.

Topology 200 may be a portion of a quantum processor's topology. Each cell 210 may couple to further cells 210 (not shown) via further intra-cell couplings 212 (not shown) and/or via other coupling means. Cells 210 may comprise any suitable subtopology, including fully-connected subtopologies (where every qubit is directly coupled to every other qubit), bipartite subtopologies (where qubits and intra-cell couplers are arranged to form a bipartite graph), and/or other subtoplogies.

FIG. 1B shows an example cell 220 comprising qubits 232a, 232b, 232c, 232d, 234a, 234b, 234c, 234d (collectively and individually, "qubits 232" and "qubits 234", respectively) coupled by intra-cell couplers 240aa, 240ab, 240ac, 240ad, 240ba, 240bb, 240bc, 240bd, 240ca, 240cb, 240cc, 240cd, 240da, 240db, 240dc, and 240dd (collectively and individually, "intra-cell couplers 240" or simply "couplers 240"). Each intra-cell coupler 240 is operable to couple together qubits 232, 234 of cell 220. For example, coupler 240aa is operable to couple qubit 232a to qubit 234a, coupler 240bc is operable to couple qubit 234b to qubit 232c, and so on.

Example cell 220 comprises a bipartite subtopology. Each qubit 232 is directly coupled to each qubit 234 (and vice-versa), but no qubit 232 is directly coupled to any other qubit 232 and no qubit 234 is directly coupled to any other qubit 234. In some implementations, additional couplers are provided between qubits 232 and/or 234 (see, e.g., FIG. 2B for an example with additional couplers). In some implementations, one or more couplers 240 are omitted (see, e.g., FIG. 2B for an example where some couplers are omitted).

In some implementations, qubits 232, 234 comprise loops of superconducting material interrupted by one or more Josephson junctions 236a, 236b, 236c, 236d, 236e, 236f, 236g, 236h (collectively and individually, "Josephson junctions 236"). Qubits 234, 236 may cross each other at crossing regions, such as crossing region 242aa between qubits 232a and 234a (other crossing regions 242 are not labelled in FIG. 1A, but will be understood to correspond generally to the placement of couplers 240). In some implementations, qubits 232, 234 are arranged so that qubits 234 are substantially parallel to each other, qubits 236 are substantially parallel to each other, and qubits 234 are substantially orthogonal to qubits 236. Qubits 232, 234 may be said to be arranged in a "grid", with qubits 232 forming columns and qubits 234 forming rows. In some implementations, qubits 232, 234 are arranged non-orthogonally—for instance, qubits 232, 234 may be arranged at 60 or 120 degree angles to each other (and/or at some other angle).

Couplers 240 may comprise loops of superconducting material located in a coupling region. Couplers 240 may be interrupted by one or more Josephson junctions (not shown). By passing a current through a coupler 240, a flux may be induced in the coupling region defined by the couplers 240 (e.g. the region contained by the perimeter of each coupler 240), thereby inducing a flux in the qubits 232, 234 being coupled. The coupling region may overlap and/or be proximate to a corresponding crossing region 242 where qubits 232, 234 cross—for the purposes of this disclosure, such couplers 240 are said to couple "at" the corresponding crossing region 242.

FIG. 1C shows an example topology 260 which generally corresponds to a specific implementation of topology 200 where each cell 210 has been implemented by a cell 220, as shown in FIG. 1B. As discussed above, cell 210a is adjacent to cell 210b. This adjacency relationship may be defined by inter-cell couplers 270 (corresponding to inter-cell couplers 212 of FIG. 1A). As depicted, qubits 232, 234 of cell 210a are coupled to qubits 232, 234 of cell 210b and cell 210d. For example, inter-cell coupler 270a couples qubit 234a of cell 210a to qubit 234e of cell 210b.

In some implementations, qubits 232, 234 of adjacent cells 210 are coupled by multiple inter-cell couplers 270. For example, qubits 234 of cell 210a are each coupled to qubits 234 of cell 210b by a corresponding inter-cell qubit 270. For instance, qubit 234a is coupled to qubit 234e by inter-cell coupler 270a, qubit 234b is coupled to qubit 234f by inter-cell coupler 270b, qubit 234c is coupled to qubit 234g by inter-cell coupler 270c, and qubit 234d is coupled to qubit 234h by inter-cell coupler 270d. Thus, four distinct direct couplings are available between cells 210a and 210b in the depicted embodiment. Qubits 232 of cell 210a are similarly coupled to qubits 232 of cell 210d by further inter-cell couplers 270.

In some implementations, inter-cell couplers 270 may overlap with at least a portion of qubits 232, 234 (e.g., as example intra-cell couplers 240 do). In some implementations, inter-cell couplers 270 are positioned proximate to qubits 232, 234 without necessarily overlapping. For example, in some implementations qubits 232, 234 are flux qubits and inter-cell couplers 270 are flux-based devices (such as rf-SQUIDs), and flux may be threaded from qubits 232, 234 through inter-cell couplers 270. In some implementations, inter-cell couplers comprise a region which couples to qubits 232, 234; that region may be overlapping with, proximate to, and/or otherwise communicatively coupled with qubits 232, 234.

Although many qubits do not share a physical coupler, and so are not directly coupled, they may be coupled by forming a "logical coupling" (or "chain") out of intervening couplers and/or qubits, as described above. In one example of such technique, qubit 232a of cell 210 may be coupled to qubit 232f by coupling qubit 232a to qubit 234a via intra-cell coupler 240aa, coupling qubit 234a to qubit 234e via inter-cell coupler 270a, coupling qubit 234e to qubit 234h via inter-cell coupler 270e, coupling qubit 234h to qubit 232e via coupler 240eh, and coupling qubit 232e to qubit 232f via inter-cell coupler 270f. Other logical couplings are possible, but in the depicted embodiment each such coupling can be expected to require at least six qubits and five couplers—four more qubits and four more couplers than would be required by a direct coupling. The use of these additional qubits and couplers can be considered the "overhead" required by the depicted topology to couple qubits 232a and 232f due to the non-adjacency of their respective cells. In topologies larger than topology 260, larger overheads may be required in some circumstances.

Figure 2A:
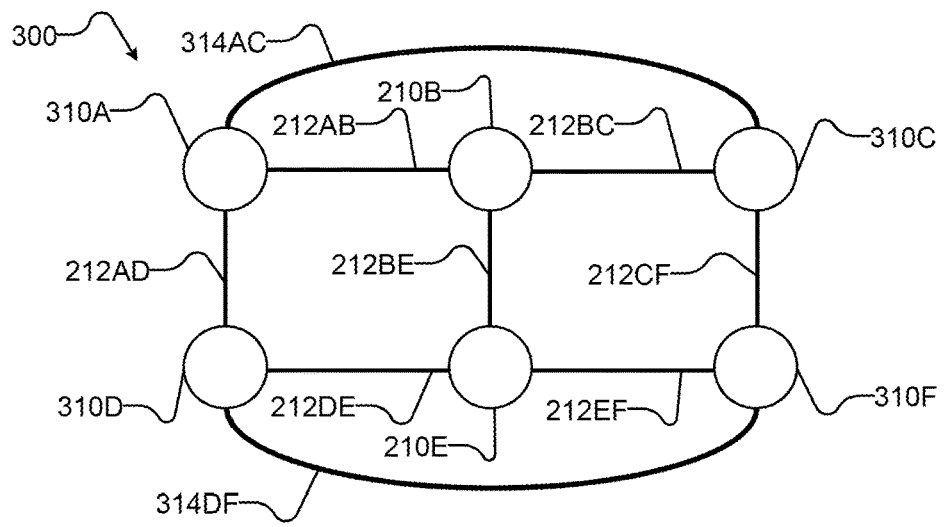
FIG. 2A shows a schematic view of an example quantum processor topology comprising cells of qubits coupled by inter-cell couplers and further coupled by long-range couplers.

FIG. 2A shows a schematic view of a topology 300 which reduces the overhead required to couple at least some qubits. Topology 300 corresponds generally to topology 200, with certain additions and variations. In particular, topology 300 comprises long-range couplers 314ac and 314df (collectively and individually "long-range couplers 314").

Long-range couplers 314 may provide communicative coupling between any qubits 232, 234 which are not otherwise coupled by intra-cell couplers 240 or inter-cell couplers 212, 270. In some implementations, long-range couplers 314 provide direct coupling between qubits 232, 234 of non-adjacent cells 310a, 310c, 310d, 310f (collectively and individually "cells 310").

Long-range couplers 314 are "long-range" in the sense that they couple qubits 232, 234 which are not adjacent. Such qubits 232, 234 would otherwise require some overhead to couple via only intra-cell couplers 240 and/or inter-cell couplers 212, 270. Long-range couplers 314 do not necessarily couple qubits 232, 234 over a greater physical distance than intra-cell couplers 240 and/or inter-cell couplers 212, 270. In some implementations, however, long-range couplers 314 do couple qubits 232, 234 over a longer physical distance than intra-cell couplers 240 and/or inter-cell couplers 212, 270. In some such implementations, long-range couplers 314 have greater coupling strength than intra-cell couplers 240 and/or inter-cell couplers 212, 270 to facilitate coupling over a greater physical distance. For example, long-range couplers 314 may couple over a physical distance which at least twice as long, three times as long, six times as long, ten times as long, and/or a hundred times as long as the physical distance(s) over which inter-cell couplers 270 couple qubits 232, 234.

In some embodiments, a plurality of long-range couplers 314 are provided between the same cells 310. For example, although couplers 314 are each shown as a single line in the high-level view of FIG. 2A, a plurality of long-range couplers 314 may be provided for each line in that view. For instance, long-range coupler 314ac may couple a first qubit of cell 310a to a second qubit of cell 310c, and a further long-range coupler 314 (not shown) may couple a third qubit of cell 310a to a fourth qubit of cell 310c. Cells which are coupled by long-range couplers 314 are not necessarily said to be "adjacent"—for instance, in the depicted example, cells 310a and 210b are adjacent due to their shared inter-cell couplers 270, but cells 310a and 310c are not adjacent as they do not share inter-cell couplers 270.

As depicted, cells 210a, 210c, 210d, and 210F of topology 200 have been replaced by cells 310A, 310c, 310d, and 310f, respectively. Long-range coupler 314ac couples qubits in cell 310a to qubits in cell 310c, and long-range coupler 314df couples qubits in cell 310d to qubits in cell 310f. Other arrangements of long-range couplers 314 are possible—for example, long-range couplers could also, or alternatively, couple qubits in cell 310a to qubits in cells 210e and/or 310f.

Cells 310 may, in some implementations, be substantially identical to their corresponding cells 210. Long-range couplers 314 may couple to qubits of cells 310 without necessarily modifying the structure of cells 210. In some implementations, cells 310 are structurally different than cells 210. For example, cells 310 may have fewer intra-cell couplers 240 to accommodate long-range couplers 314. Cells 310 may have more, fewer, or the same number of qubits as cells 210, and the qubits of cells 310 may have different shapes than the qubits 232, 234 of cells 210. In some implementations, cells 210, 310 are non-uniform; cells 210 may differ from each other, and cells 310 may differ from each other.

Figure 2B:
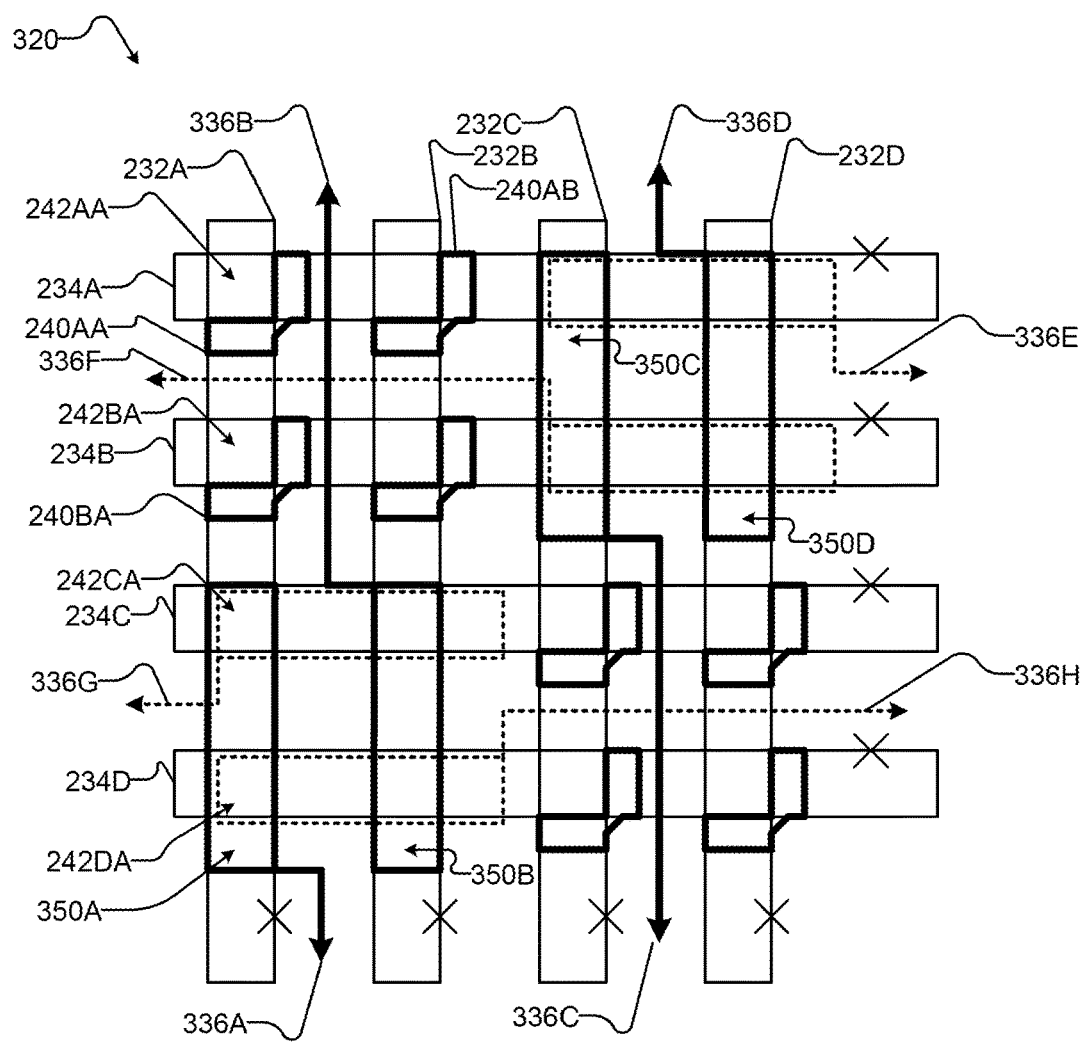
FIG. 2B shows a schematic view of an example cell of qubits comprising an example long-range coupler, having for example, a four-qubit-by-four-qubit construction.

FIG. 2B shows a schematic diagram of an example cell 320 for coupling qubits 232, 234 to long-range couplers 314. As depicted, the qubits 232, 234 of cell 320 may, for example, correspond generally to qubits 232, 234 of cell 220. Relative to cell 220, cell 320 omits certain intra-cell couplers 240 and adds long-range couplers 336a, 336b, 336c, 336d, 336e, 336f, 336g, and 336h (collectively and individually, "long-range couplers 336"). For clarity, long-range couplers 336E-336h are shown in dashed lines and at a slight offset from qubits 234—this depiction is not intended to limit long-range couplers 336e-336h to any particular construction or position.

In some implementations, long-range couplers 336 have greater coupling strength than intra-cell couplers 240 and/or inter-cell couplers 270. In some such implementations, long-range couplers 336 have a relatively large coupling area with qubits 232, 234 (relative to intra-cell couplers 240 and/or inter-cell couplers 270). For example, in some implementations long-range couplers 336a-336d may couple with qubits 232 over coupling regions 350A-350d, which are substantially larger than the coupling regions of intra-cell couplers 240. Coupling regions 350a-350d may also (or alternatively) be larger than the coupling regions of inter-cell couplers 270.

In some implementations, qubits 232, 234 extend primarily along a major axis (i.e. they may be elongated in substantially one direction) and long-range couplers 336 have coupling regions 350 which extend along a length of corresponding qubits 232, 234. Coupling regions 350 may extend along, for example, roughly half the length of a qubit 232, 234. For example, coupling region 350a extends along roughly half the length of qubit 232a (note that FIG. 2B is not necessarily to scale, and some elements may be exaggerated or reduced in size to emphasize particular features). In some implementations, coupling regions 350 of long-range couplers 336 extend along approximately two thirds of the length of qubits 232, 234. In general, larger coupling regions 350 between qubits 232, 234 and long-range couplers 350 tend to increase the coupling strength of long-range couplers 336.

Figure 4A:
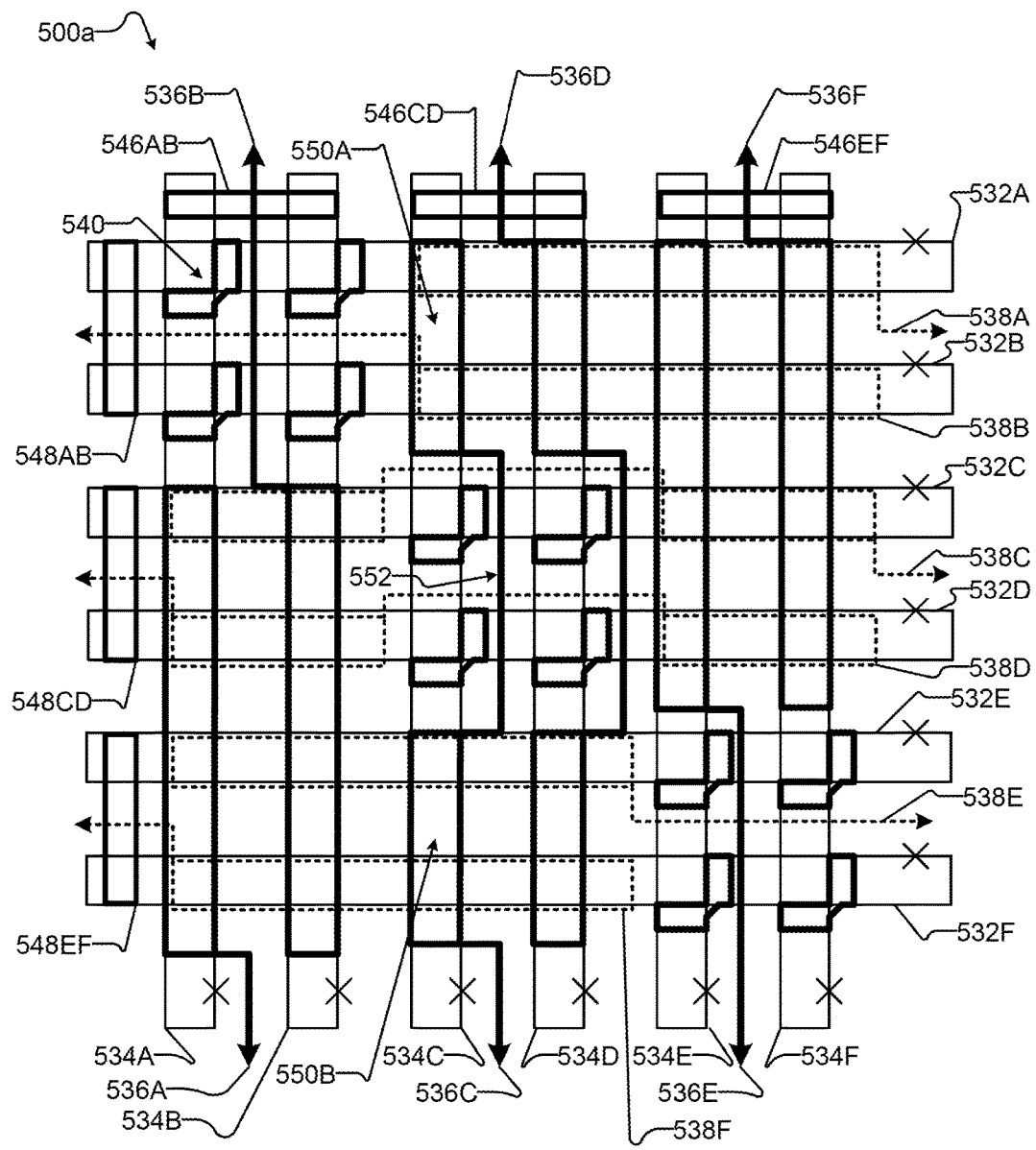
FIG. 4A shows a schematic view of an example cell of qubits comprising a long-range coupler, having for example, a six-qubit-by-six-qubit construction.

In some implementations, long-range couplers 336 comprise a plurality of coupling regions 350 which are coupled together. For example, a long-range coupler 336 may be interrupted by a feature, such as one or more intra-cell couplers 240 (and/or other features). The interrupting feature may thus be disposed between coupling regions 350 of long-range coupler 336. The long-range coupler may pass around the interrupting feature without coupling to the corresponding qubit 232, 234 at that location, and may communicatively couple the plurality of coupling regions 350 (e.g., by a connecting length of superconducting material). An example of such long-range couplers 336 is shown in FIG. 4A.

In some implementations, such as the depicted embodiment, long-range couplers 336 extend across one or more crossing regions 242. In some implementations, long-range couplers 336 extend across a plurality of crossing regions 242. For example, long-range coupler 336a extends across crossing regions 242ca and 242da, and coupling region 336a overlaps with crossing regions 242ca and 242da as well as the intervening portion of qubit 232a. Although it is not necessary for long-range couplers 336 to extend across crossing regions, this can be a convenient measure for the length of long-range couplers 336 and/or the size of coupling area 350a (and, thus, it can be a convenient indirect measure of the coupling strength of long-range couplers 336). In some implementations, intra-cell couplers 240 may be omitted at crossing regions 242 which long-range couplers 336 extend across, so the number of crossing regions 242 which long-range couplers 336 extend across may provide a convenient measure of the cost (in terms of reduced intra-cell connectivity) of providing long-range couplers 336.

In some implementations, long-range couplers 336 are spaced apart from intra-cell couplers 240 to reduce crosstalk between long-range couplers 336 and intra-cell couplers 240. In some implementations, the spacing between long-range couplers 336 and intra-cell couplers 240 is sufficiently small for coupling regions 250 of long-range couplers 336 to reside only between crossing regions 242. In some such implementations, no intra-cell couplers 240 are omitted to make room for long-range couplers.

FIG. 2B only shows a part of long-range couplers 336, as long-range couplers 336 extend beyond cell 320 and couple to qubits in other cells (e.g., another cell 320). An example of a complete long-range coupler 336 can be seen in FIG. 2C.

Figure 2C:
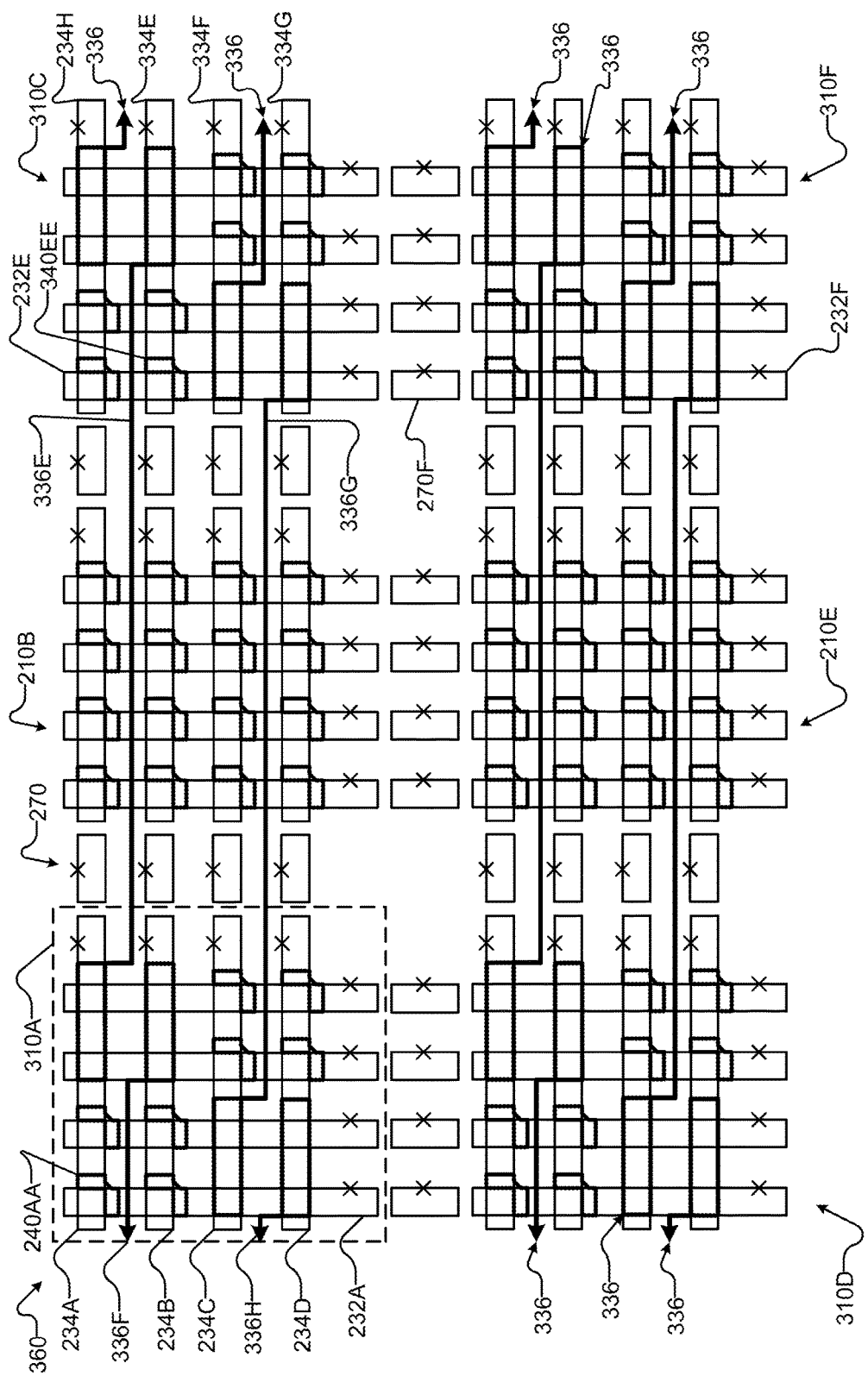
FIG. 2C shows a schematic view of an example quantum processor topology according to FIG. 2A implemented with the cell of FIG. 2B.

FIG. 2C shows an example topology 360 which generally corresponds to a specific implementation of topology 300 where each cell 210 has been implemented by a cell 220 (as shown in FIGS. 1B, 1C) and each cell 310 has been implemented by a cell substantially corresponding to cell 320 of FIG. 2B.

As depicted, long-range coupler 336e couples qubit 234a of cell 310a to qubit 334e of cell 310c; similarly, long-range coupler 336g couples qubit 234c of cell 310a to qubit 334g of cell 310c. The depicted implementations omits columnwise long-range couplers 336a-336d partly for clarity (so row-wise couplers 336e-336h are more easily seen) and partially because, in the relatively simple example topology 300, no column-wise long-range couplers 314. Skilled readers will understand that such column-wide long-range couplers 314 may be provided in suitable topologies. The depicted implementations does show long-range couplers 336f, 336h, and other couplers 336 which do not couple to any depicted cell 210, 310; such couplers 336 may be omitted or included depending on the availability of corresponding cells 210, 310 to couple to (not shown).

The connectivity provided by inter-cell couplers 270 in topology 300 is substantially the same as in topology 200 of FIG. 1C. For example, cell 310a is adjacent to cells 210b and 310d but not cells 310c, 210e, or 310f. However, long-range couplers 336 may allow for lower-overhead coupling between qubits in non-adjacent cells 210, 310 than was possible in topology 200. For example, qubit 232a may be coupled to qubit 232f as follows: qubit 232a is coupled to qubit 234a via intra-cell coupler 240aa, qubit 234a is coupled to qubit 334e of cell 310c via long-range coupler 336e, qubit 334e is coupled to qubit 232e via intra-cell coupler 340ee, and qubit 232e is coupled to qubit 232f via intra-cell coupler 270f. In total, five qubits 232, 234 and four couplers 240, 270, 336 are used, corresponding to an overhead of three qubits 232, 234 and three couplers 240, 270, 336. This represents a reduction in overhead relative to the example coupling between qubits 232a and 232f enabled by topology 200 (which required an overhead of at least four qubits 232, 234 and four couplers 240, 270). For larger topologies with longer-range long-range couplers 336, the reduction in overhead may be significantly greater.

Long-range couplers 336 may couple any suitable pairs of qubits 232, 234. In some implementations where the structures of cells 310 generally correspond, a long-range coupler 336 coupled to one qubit may couple to the corresponding qubit in another cell 310. For example, long-range coupler 336g may couple to qubit 234c of cell 310a (as shown) and to qubit 334c of cell 310c. In some implementations, long-range couplers 336 couple to non-corresponding qubits 232, 234. For example, long-range coupler 336g may couple to qubit 234c of cell 310a (as shown) and to qubit 334c of cell 310c (as shown); qubits 234c and 334c occupy different positions in their respective cells 310. As another example, long-range couplers 336 may couple qubits with different connectivities (e.g., with different numbers and/or arrangements of intra-cell couplers 240 and/or inter-cell couplers 270), different shapes, and/or other different characteristics (e.g., different inductances).

Figure 3A:
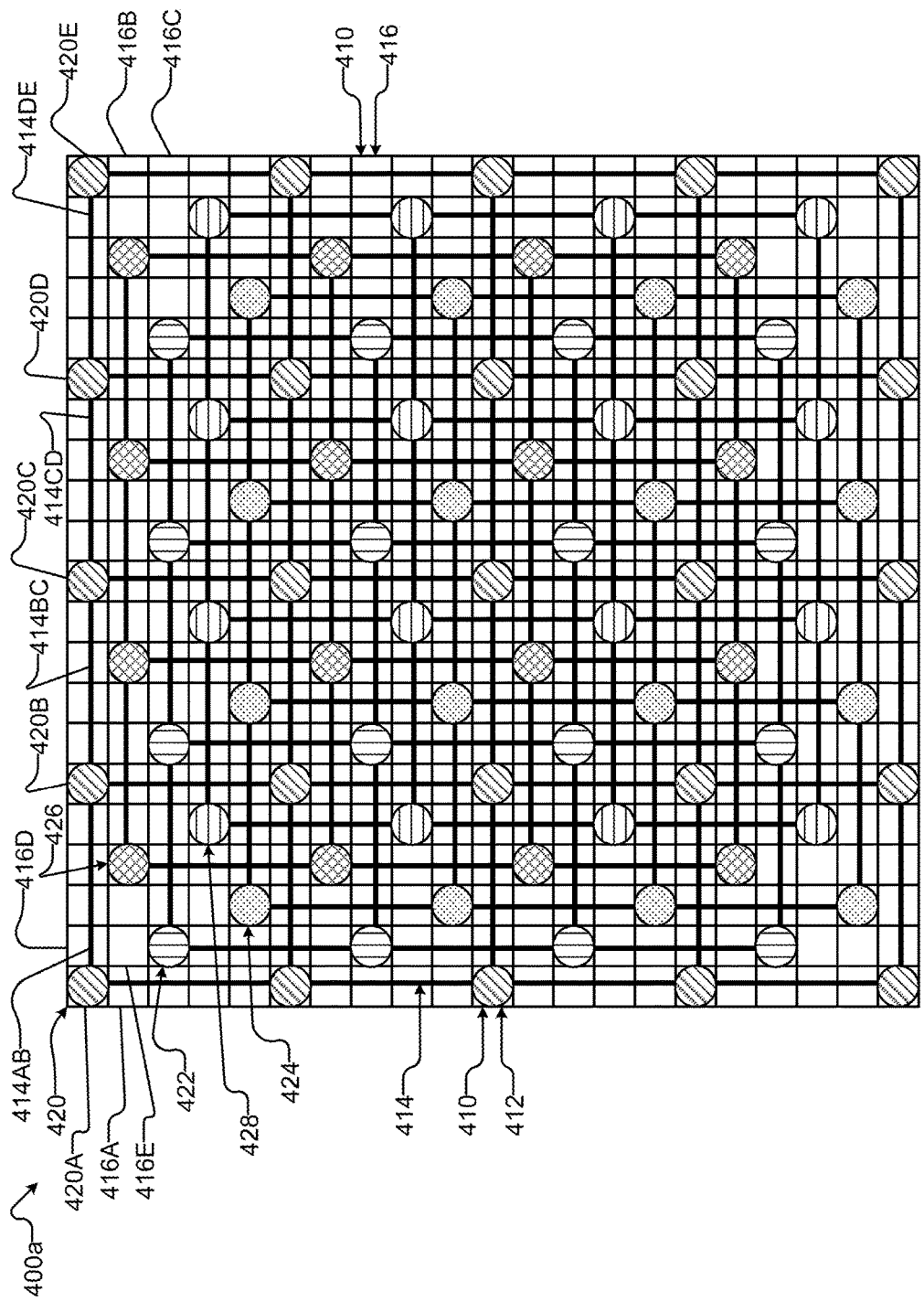
FIG. 3A shows a schematic view of an example quantum processor topology comprising long-range couplers.
Figure 3B:
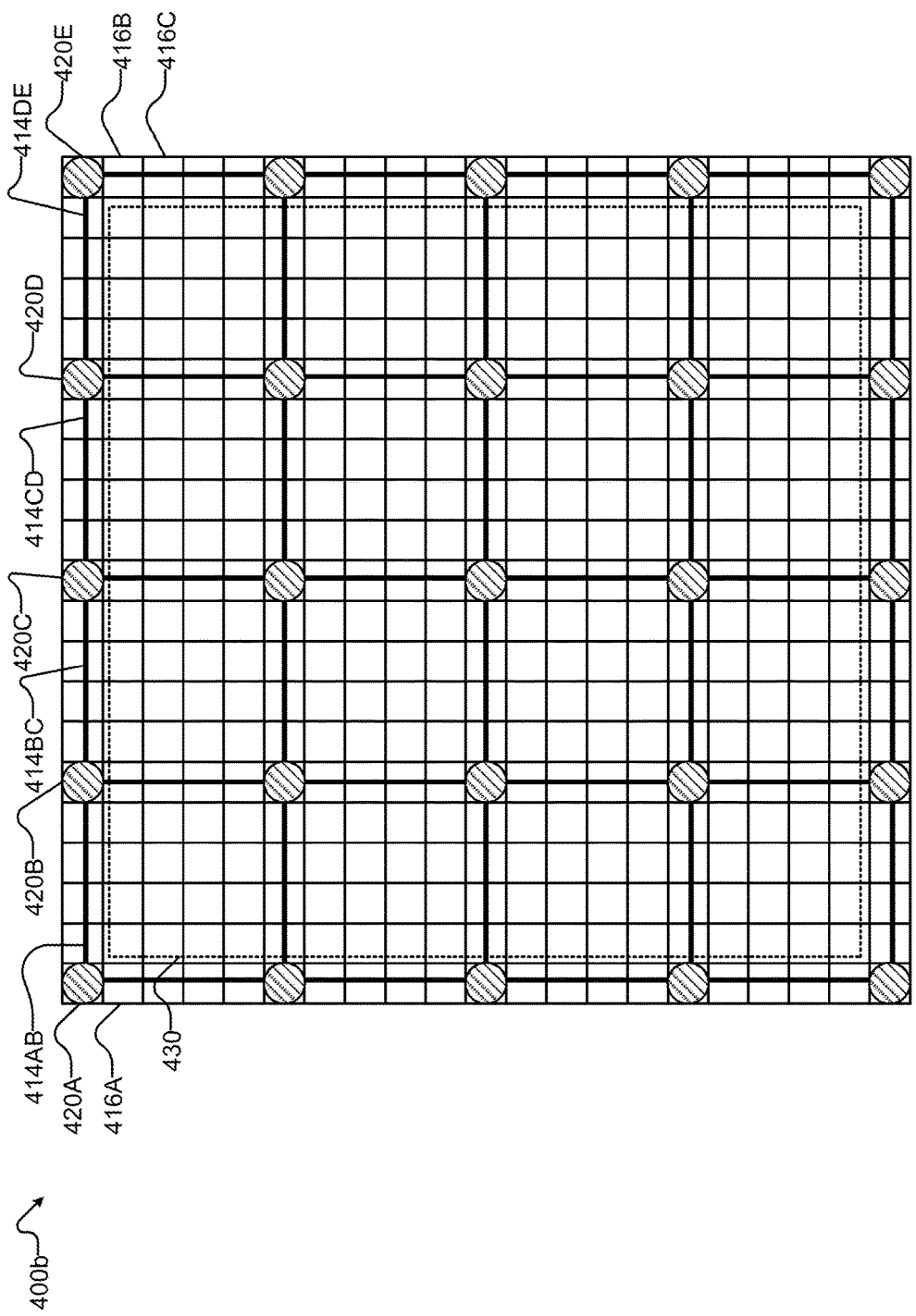
FIG. 3B shows a simplified schematic view of the topology of FIG. 3A, wherein some elements have been omitted for clarity.

FIG. 3A shows a schematic view of an example quantum processor topology 400a. FIG. 3B shows a simplified topology 400b which corresponds to topology 400a of FIG. 3A but omits various elements to more clearly show certain features, as discussed below. The following discussion refers primarily to topology 400a; unless the context dictates otherwise, the following discussion of FIG. 3A and topology 400a apply also FIG. 3B and topology 400b. FIGS. 3A and 3B are collectively and individually referred to herein as "FIG. 3".

Topology 400a comprises cells 410. Cells 410 may comprise any suitable subtopology or subtopologies of qubits and couplers. For example, cells 410 may comprise the subtopologies of cells 220 and/or 320, and/or other subtopologies. Each cell 410 is adjacent to one or more other cells 410—that is, one or more inter-cell couplers (not shown) controllably couple one or more qubits (not shown) of each cell 410 to one or more qubits (not shown) of one or more adjacent cells 410.

In some implementations, each cell 410 comprises a similar or identical topology to each other cell 410. For example, each cell 410 may comprise a long-range cell 412 (i.e., a cell having one or more qubits coupled to one or more long-range couplers 414). In some implementations, the subtopologies of certain cells 410 may differ from other cells 410 to account for, for example, characteristics of topology 400a—for instance, cells 410 along an outer boundary of topology 410 may have qubits and/or couplers with different shapes, arrangements, and/or other characteristics due to their placement relative to other, similar cells 410 located elsewhere (and/or due to other factors). In some implementations, cells 410 comprise subtopologies of different types—for example, in some embodiments cells 410 may comprise long-range cells 412 (i.e., cells having qubits coupled to long-range couplers 414), local cells 416 (i.e., cells not having qubits coupled to long-range couplers), and/or other types of cells 410. In some implementations, long-range cells 412 are divided into various subsets, such as subsets 420, 422, 424, 426, and 428, as described below.

For convenience, where one cell 410 has qubits which couple to qubits of another cell 410, the two cells 410 may be said to couple—it will be understood that the coupling is between qubits of cells 410. Similarly, where qubits of a cell 410 couple to a coupler (e.g., an inter-cell coupler or a long-range coupler 414), the cell 410 may be said to couple to the coupler —it will be understood that the coupling is between a qubit of the cell and the coupler.

Cells 410 may be positioned and coupled in any suitable way. As described above, adjacent cells 410 are not necessarily physically proximate to each other on the quantum processor—adjacency is a relationship defined by inter-cell couplers, and not necessarily by physical location. However, in some implementations, including example topology 400a, cells 410 are adjacent to their physically or spatially neighbouring cells 410 (e.g., as shown in FIG. 2C, where cell 310A is adjacent to cells 210B and 310D). For example, cell 420A is adjacent to cells 416A and 416D. In some implementations, cells 410 are arranged substantially in a grid or an array, with each cell 410 being adjacent to its neighbouring cells within the same row and/or column. In some implementations, cells 410 may be adjacent to next-nearest neighbours as well (or alternatively). For instance, in a variation of the grid-like or array example topology 400a, an additional inter-cell coupler (not shown) may couple cell 420a to cell 416e, thereby causing cell 420a to be adjacent to cell 416e (e.g. the additional inter-cell coupler could extend "diagonally" across both a row and a column to couple cell 420a to cell 416e).

Topology 400a of FIG. 3A is shown schematically, and may omit certain features and/or exaggerate other features for the sake of convenience. For example, although cells 410 are shown as having abutting sides, persons skilled in the art will appreciate that cells 410 may be spaced apart (e.g., as shown in FIG. 2C). Further, although cells 410 are shown in a regular grid or array, persons skilled in the art will appreciate that cells 410 may be positioned irregularly (and/or in a different regular arrangement) without necessarily changing the adjacency relationship depicted in FIG. 3A. Thus, FIG. 3A should be viewed as providing a logical graph of topologies 400a and 410b and not necessarily a to-scale spatial representation of cells 410.

In some implementations, topology 400a comprises a plurality of long-range cells 412 coupled to long-range couplers 414. For example, long-range cell 420a may be coupled to long-range cell 420b via long-range coupler 414ab. Long-range coupler does not couple to intervening local cells 416, such as cell 416d.

Long-range couplers 412 reduce the coupling distance between certain cells 410. For example, local cell 416a is coupled to local cell 416b via two inter-cell couplers and four long-range couplers 414 (and, potentially, with some number of intra-cell couplers, depending on the subtopologies of cells 410). For instance, in the illustrated example topology 400a without long-range couplers 412, local cell 416a would require at least 20 inter-cell couplers to couple to local cell 416b—for example, by coupling local cell 416a to a chain extending from adjacent local cell 416e to local cell 416b across a row of example grid-like topology 400a.

In some implementations, the plurality of long-range cells 412 are divided into subsets (which may be referred to as "coverings"), such as coverings 420, 422, 424, 426, and 428. Each covering 420, 422, 424, 426, and 428 comprises a plurality of long-range cells 412 which are coupled to each other via long-range couplers 414 (and, optionally, intra-cell couplers) without the use of inter-cell couplers. Long-range cells 412 within a covering 420, 422, 424, 426, or 428 are not necessarily directly coupled via long-range couplers 414; long-range cells 412 within a covering 420, 422, 424, 426, or 428 may be coupled via a chain of long-range couplers, e.g., as described above. In some implementations, a long-range cell 414 may be a member of multiple coverings 420, 422, 424, 426, and/or 428. In some implementations, one covering (e.g. covering 420) comprises all long-range cells 412.

In some implementations, the long-range cells 412 of each covering 420, 422, 424, 426, and/or 428 are spread out so that each local cell 416 is no more than a given coupling distance from the nearest long-range cell 412 of the given covering 420, 422, 424, 426, or 428. This given coupling distance may be referred to as the "covering density value". The covering density value may be any suitable value. For example, in the depicted implementations, each local cell 416 is separated from the nearest long-range cell 416 of example covering 420 by no more than three intervening cells 410. Thus, in this example (and in the absence of additional constraints imposed by any given embedded problem), at most four inter-cell couplers are required to couple any given local cell 416 to the nearest long-range cell of covering 420. In this example, covering 420 may be said to have a covering density value of 4.

Note that a reference to a covering density value does not mean that every local cell 416 requires exactly that number of inter-cell couplers to couple to a long-range cell 412. Some cells 416 may require a smaller number of inter-cell couplers to complete the coupling. For example, local cell 416c may be coupled to long-range cell 420E by the use of two inter-cell couplers (by coupling local cell 416c to local cell 416b via an inter-cell coupler, and by coupling local cell 416b to long-range cell 420e via another inter-cell coupler). Further, in some circumstances, a local cell 416 may couple to a long-range cell 420 via a larger number of inter-cell couplers (such as when a given problem being embedded is using some inter-cell couplers to complete other couplings, thereby requiring a particular local cell 416 to couple to a long-range cell 420 via a longer chain of inter-cell couplers than might otherwise be required).

In some implementations, at least some coverings 420, 422, 424, 426, and 428 have different covering density values than other coverings 420, 422, 424, 426, or 428. For example, covering 422 may provide a relatively small number of relatively spaced-apart long-range cells 412, whereas covering 424 may provide a larger number of relatively more closely-spaced long-range cells 412. In some implementations, including the example illustrated implementation, each covering 420, 422, 424, 426, and 428 comprises the same covering density value—in the example depicted, the covering density value is 4 for each covering 420, 422, 424, 426, and 428.

In some implementations, each covering 420, 422, 424, 426, and 428 has a corresponding covering region, and each local cell 416 within the covering region is no more than a given coupling distance from the nearest long-range cell 412 of the given covering 420, 422, 424, 426, or 428. For example, covering 420 may correspond to a covering region 430 (see FIG. 3B). Only the covering region 430 of covering 420 is shown, for the sake of clarity, but it will be understood that each covering 420, 422, 424, 426, and 428 may comprise similarly- and/or different-defined covering regions, which will collectively and individually be referred to herein as covering regions 430. Local cells 416 located outside of covering region 430 may (but do not necessarily) have a coupling distance with the nearest long-range cell of the covering 420, 422, 424, 426, or 428 that is greater than the covering density value.

In some implementations, covering region 430 of a given covering 420, 422, 424, 426, or 428 comprises every cell 410 which is more than a threshold coupling distance from an outer boundary of topology 400. For example, covering region 430 may comprise every cell not located along the perimeter of topology 400 (e.g., such a covering region 430 may exclude cells 416a-416d but not 416e). FIG. 3B depicts an example of such a covering region 430. Such embodiments may be desirable when, for example, higher connectivity toward the center of topology 400a is considered more useful than higher connectivity toward the outer boundary of topology 400a.

In some implementations, each long-range cell 416 within another the covering region 430 of another covering 420, 422, 424, 426, or 428 also obeys the covering density value of the other covering 420, 422, 424, 426, or 428. That is, the coupling distance of the long-range cell 416 from the nearest long-range cell 412 of the other covering 420, 422, 424, 426, or 428 is no more than covering density value of the other covering 420, 422, 424, 426, or 428.

In some implementations, each local cell 416 within a particular covering region 430 is adjacent to at least one long-range cell 412. Different local cells 416 within the covering region 430 may be adjacent to long-range cells 412 of different coverings 420, 422, 424, 426, or 428. In some implementations, each covering 420, 422, 424, 426, or 428 has the same covering region 430. In some implementations, coverings 420, 422, 424, 426, and 428 may have different covering regions 430, and at least the local cells 416 in the intersection of those covering regions 430 (i.e., local cells 416 which are in each of those covering regions).

For example, in the depicted example topology 400a, every local cell 416 in covering region 430 is adjacent to at least one long-range cell 412. In the depicted example, some local cells 416 outside of covering region 430 are also adjacent to long-range cells 412 (e.g., cell 416b is adjacent to long-range cell 420e) and some local cells 416 are not necessarily adjacent to long-range cells 412. For instance, where cells are only adjacent to nearest-neighbours in the same row and column, local cell 416c is not adjacent to any long-range cell 412.

In some implementations, one or more coverings 420, 422, 424, 426, and/or 428 overlap, meaning that their respective covering regions 430 each share at least one cell 410. In some implementations, coverings 420, 422, 424, 426, and/or 428 have respective covering regions 430 which each contain a long-range cell 412 of their overlapping coverings 420, 422, 424, 426, and/or 428. Thus, in such implementations, only a relatively small number of couplings may be required to couple a covering 420, 422, 424, 426, or 428 with any overlapping coverings 420, 422, 424, 426, and/or 428 (since they have long-range cells which may be considered to be close to each other, in terms of coupling distance).

In suitable implementations, topology 400a may be said to have a dimension (e.g., a length, width, diameter, and/or other measure) comprising a number of cells. For example, in the example grid-like topology 400a with 21 cells 410 to each row and 21 cells 410 to each column, the dimension of topology 400 may be said to be 21. One or more coverings 420, 422, 424, 426, or 428 may comprise a similarly-defined dimension which is less than the dimension of topology 400a. For instance, example depicted covering 420 may comprise a dimension of five (e.g., because it has five long-range cells 420 to a column) and example depicted covering 422 may comprise a dimension of four.

In some implementations, the long-range cells 412 of one or more coverings 420, 422, 424, 426, and/or 428 are sparse in topology 400a. For instance, in some implementations, at least one covering 420, 422, 424, 426, and/or 428 has a dimension which is no more than half the dimension of topology 400a. Generally speaking, the smaller the ratio of the dimension of covering 420, 422, 424, 426, and/or 428 relative to the dimension of topology 400a, the more sparse covering 420, 422, 424, 426, and/or 428 is (relative to another covering 420, 422, 424, 426, and/or 428 with a higher ratio covering an area of similar size). For instance, the ratio of dimensions may be no more than one-third, one-quarter, one-fifth, one-tenth, or any other suitable value. Long-range cells 412 may be regularly spaced apart so that each pair of long-range cells 412 coupled by a long-range coupler 414 have one or more intervening local cells 416 (and/or other long-range cells 412 of other coverings 420, 422, 424, 426, and/or 428).

In some implementations, topology 400a and one or more coverings covering 420, 422, 424, 426, and/or 428 are arranged in grids or arrays, with covering 420, 422, 424, 426, and/or 428 comprising sub-grids of topology 400a. The dimension of topology 400a and coverings 420, 422, 424, 426, and/or 428 may be defined by the number of cells 410 along an axis of the grid or array (e.g. along a row or column axis). Long-range cells 412 may be regularly-spaced and may substantially cover topology 400a. FIG. 3A depicts such an example.

Figure 4B:
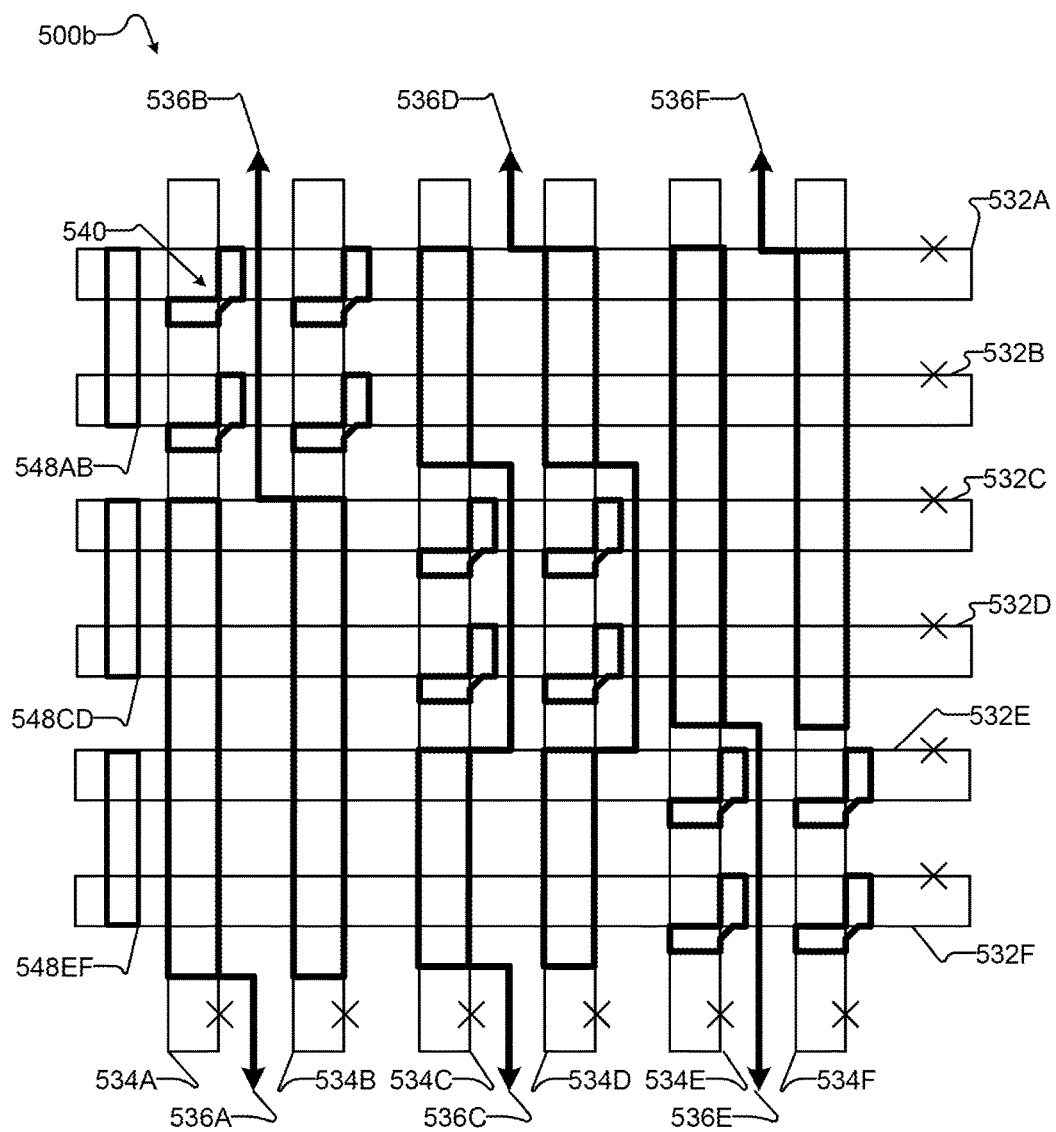
FIG. 4B shows a simplified schematic view of the cell of FIG. 4A, wherein some elements have been omitted for clarity.

FIG. 4A shows a schematic view of an example long-range cell 500a. FIG. 4B shows a simplified long-range cell 500b which corresponds to cell 500a of FIG. 4A but omits various elements to more clearly show certain features, as discussed below. The following discussion refers primarily to cell 500a; unless the context dictates otherwise, the following discussion of FIG. 4A and topology 500a apply also FIG. 4B and topology 500b. FIGS. 4A and 4B are collectively and individually referred to herein as "FIG. 4".

Cell 500a comprises certain features which substantially correspond to those of cell 320. For example, cell 500a comprises qubits 532a-532f and 534a-534f (collectively and individually "qubits 532" and "qubits 534", respectively) which are controllably coupled via intra-cell couplers 540 and are further coupled to long-range couplers 536a-536f and 538a-538f (collectively and individually "qubits 532" and "qubits 534", respectively). Long-range couplers 538 are shown in dashed outline and at a slight offset for clarity; that depiction is not intended to imply any physical structure. As noted above with respect to cell 320, qubits 532, 534 and couplers 540 may be arranged in any suitable way and may comprise any suitable construction.

In some implementations, one or more long-range couplers 536, 538 are interrupted by one or more features. For example, in the depicted embodiment, long-range couplers 536c, 536d, 538c, and 538d are each interrupted by two intra-cell couplers 540. Long-range coupler 536c comprises a plurality of coupling regions 550a and 550b (collectively and individually coupling region 550) which are coupled to each other by coupling portion 552. Long-range couplers 536d, 538c, and 538d may be similarly or differently constructed; in the depicted implementation, they comprise analogous coupling regions 550 and coupling portions 552.

In some implementations, qubits 532, 534 are divided into qubit subsets where qubits in the same qubit subset are not coupled by an intra-cell couplers 540. For example, cell 500a may implement a bipartite graph, e.g., as described above, where each partition corresponds to a qubit subset. Qubit subsets may comprise any number of qubits. For example, a qubit subset may comprise a single qubit. In some implementations, each qubit subset comprises an equal number of qubits—for instance, in a cell with two qubit subsets, each subset may comprise half of the qubits of the cell.

In some implementations, cell 500a comprises one or more intra-subset couplers 540, which may increase connectivity. For example, qubits 534a and 534b may be coupled by intra-subset coupler 546ab, qubits 534c and 534d may be coupled by intra-subset coupler 546cd, and qubits 534e and 534f may be coupled by intra-subset coupler 546ef. Qubits 532 may be similarly coupled by intra-subset couplers 548ab, 548cd, and 548ef. Intra-subset couplers 546ab, 546cd, 546ef, 548ab, 548cd, and 548ef are collectively and individually referred to as "intra-subset couplers 546" and "intra-subset couplers 548", respectively.

In some implementations, intra-subset couplers 546, 548 couple qubits 532, 534 which are coupled to long-range couplers 536, 538 which couple to different cells 410 in topology 400a. For example, long-range coupler 536c couples qubit 534c to a qubit in a first cell 410 (not shown) and long-range coupler 536d couples qubit 534d to a qubit in a second cell 410 (not shown). By providing a direct coupling between qubits 534c and 534d, first and second cells 410 may be coupled relatively conveniently through cell 500a by coupling qubits 534c and 534d via coupler 546cd. FIG. 4B omits intra-subset couplers 546 and long-range couplers 538 so that intra-subset couplers 548 and long-range couplers 536 may be more clearly seen.

The long-range couplers 536, 538 associated with intra-subset couplers 546ab, 546ef, and 548 may couple to the same or different cells 410 than the long-range couplers 536c, 536d associated with intra-subset coupler 546cd. In some implementations, cell 500a is coupled to a plurality of other cells 410, with a plurality of long-range couplers 536, 538 coupling cell 500a to each of the other cells 410. For example, in some embodiments long-range couplers 536a, 536c, and 536e each couple to qubits in a first cell 410, long-range couplers 536b, 536d, and 536f each couple to qubits in a second cell 410, long-range couplers 538a, 538c, and 538e each couple to qubits in a third cell 410, and long-range couplers 538b, 538d, and 538f each couple to qubits in a fourth cell 410. Thus, in the depicted implementations, three long-range couplers 536, 538 couple cell 500 to each of four other cells 410.

In some implementations, intra-subset couplers 546, 548 are spaced apart from intra-cell couplers 540. In some implementations, intra-subset couplers 546, 548 are disposed proximate to a boundary of cell 500a (e.g. as shown in FIG. 4A). Qubits 532, 534 may be extended to provide space for intra-subset couplers 546, 548.

Cell 500a may comprise any suitable number of qubits 532, 534 and couplers 536, 538, 540, 546, 548. As depicted, cell 500a comprises 12 qubits 532, 534, arranged in a grid with six row-wise qubits 532 and six column-wise qubits 534. A larger or smaller number of qubits may be provided, in a similar or different arrangement. For example, FIG. 3B shows an example four-by-four row/column grid. Seven-by-seven, eight-by-eight, nine-by-nine, ten-by-ten, 20-by-20, and other-sized grids may be provided. Some implementations are not entirely grid-based, and may comprise grid- and non-grid arrangements or may be entirely non-grid based. For example, cell 500a may be arranged as a ring, chain, tree, star, a bus-based arrangement, an irregular arrangement, and/or otherwise arranged according to a suitable subtopology.

The various implementations and/or embodiments described herein provide systems, apparatus and methods for a increasing the connectivity of an analog processor. Analog processors implementing these techniques can be advantageous in applications involving solving problems which benefit from high connectivity across large regions of the processor. Such processors may be advantageous over other analog processors, such as the analog processors described with reference to FIG. 1, because the disclosed techniques provide relatively high connectivity between relatively distant cells without requiring non-linear growth in the number of couplers (which would be required to provide a fully-connected graph).

Throughout this specification and the appended claims, the term "adjacent" when used to describe two or more cells is used to indicate that the cells are directly coupled by an inter-cell coupler. Cells which are adjacent in this sense may not necessarily be physically proximate on a surface of an analog processor in all implementations or embodiments of the present systems, apparatus, and methods.

Throughout this specification and the appended claims, the term "cell" is used to indicate a subtopology of one or more qubits, and does not connote any particular structure. For greater certainty, "cell" includes singleton cells—that is, cells comprising a single qubit. Thus, the term "cell" is strictly broader than the term "qubit". Except where certain implementations or embodiments disclosed herein expressly require a plurality of qubits, the present disclosure encompasses implementations or embodiments wherein qubits have not been grouped together into multi-qubit cells; in such implementations or embodiments, each qubit may implicitly be considered a "cell".

Throughout this specification and the appended claims, the term "couple" and its derivatives (e.g., "coupled", "couples") when used to describe two or more devices (e.g., two or more qubits, one or more qubits and one or more couplers, etc.) refers to providing a controllable communicative coupling between the two or more devices via one or more couplers. Two devices which are described as "coupled" herein may, at times, be controlled to behave as though they are not coupled. Accordingly, "couple" and its derivatives include the meaning of the term "coupleable". A coupler provides a communicative path between the devices it couples. Devices which are coupled by a single coupler without the use of intervening or further couplers are said to be "directly" coupled. A coupler which directly couples two devices may interact with those devices through intermediary non-coupler structures. Throughout this specification and the appended claims, devices which are referred to as being "coupled" are not necessarily directly coupled by a coupler (unless the coupling is said to be "direct"), and may be indirectly coupled by a plurality of couplers and/or other devices (such as qubits).

Throughout this specification and the appended claims, the term "superconducting" when used to describe a physical structure is used to indicate a material that is capable of behaving as a superconductor at an appropriate temperature. A superconducting material may not necessarily be acting as a superconductor at all times in all embodiments of the present systems and devices.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other analog processors, not necessarily the exemplary quantum processors generally described above.

The various embodiments described above can be combined to provide further embodiments. To the extent that they are not inconsistent with the specific teachings and definitions herein, all of the U.S. patents, U.S. patent application publications, U.S. patent applications, referred to in this specification and/or listed in the Application Data Sheet including but not limited to U.S. Pat. No. 8,174,305 to Harris, U.S. Pat. No. 8,772,759 to Bunyk et al., and U.S. patent application Ser. No. 14/691,268 to Bunyk et. al., and which are assigned to the assignee of this application are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The various embodiments described above can be combined to provide further embodiments. All of the commonly assigned US patent application publications, US patent applications, foreign patents, foreign patent applications and non-patent publications referred to in this specification and/or listed in the Application Data Sheet, including but not limited to 62/288,719, filed Jan. 29, 2016 are incorporated herein by reference, in their entirety.

What is claimed is:

1. A quantum processor comprising:
a plurality of cells, each cell comprising one or more qubits;
one or more inter-cell couplers, each inter-cell coupler providing controllable communicative coupling between a first inter-cell coupling qubit of the one or more qubits to a second inter-cell coupling qubit of another cell, whereby direct coupling by the inter-cell couplers defines an adjacency relationship between the cells of the first and second inter-cell coupling qubit; and
a long-range coupler providing controllable communicative coupling between a first qubit of a first cell and a second qubit of a second cell, the second cell non-adjacent to the first cell;
wherein each inter-cell coupler of the first cell provides direct controllable communicative coupling over a first physical distance which is at most a threshold inter-cell physical coupling distance and the long-range coupler provides direct controllable communicative coupling over a second physical distance at least a threshold long-range physical coupling distance, the long-range physical coupling distance greater than the inter-cell physical coupling distance, and
wherein, fix at least the first cell:
each of the one or more inter-cell couplers couples to the respective first inter-cell coupling qubit at one or more inter-cell coupling region, each inter-cell coupling region having at most an inter-cell coupling area;
the long-range coupler couples to the first qubit over a long-range coupling region having at least a long-range coupling area, the long-range coupling area greater than the inter-cell coupling area;
the long-range coupler passes through one or more intervening cells disposed between the first and second cells; and
the long-range coupler is isolated from the qubits of the intervening cells so that the long-range coupler does not couple the first qubit to any of the intervening qubits.

2. A quantum processor according to claim 1 wherein, for at least the first cell of the one or more cells:
the one or more qubits comprises a plurality of qubits; and
the first cell comprises one or more intra-cell couplers, each intra-cell coupler providing controllable communicative coupling between at least two of the plurality of qubits.

3. A quantum processor according to claim 2 wherein, for at least the first cell: each of the one or more intra-cell couplers couples to the corresponding pair of qubits at one or more intra-cell coupling regions, each intra-cell coupling region having at most an intra-cell coupling area; and the long-range coupler couples to the first qubit over a long-range coupling region, the long-range coupling region which extends across at least a part of each of a plurality of crossing regions of the first qubit.

4. A quantum processor according to claim 3 wherein: each qubit in a first qubit subset of the one or more qubits crosses a portion of each qubit in a second qubit subset of the one or more qubits at a crossing region; each intra-cell coupler provides controllable communicative coupling between a first intra-cell coupling qubit of the first qubit subset and a second intra-cell coupling qubit of the second qubit subset at the corresponding intra-cell coupling region, the intra-cell coupling region proximate to the crossing region; and the first qubit is in the first qubit subset.

5. A quantum processor according to claim 4 wherein: the plurality of intra-cell couplers couple each qubit of the first qubit subset to at least one qubit of the second qubit subset; and the plurality of intra-cell couplers couple each qubit of the second qubit subset to at least one qubit of the first qubit subset.

6. A quantum processor according to claim 4 wherein: the long-range coupling region comprises a first coupling region and a second coupling region, each coupling region coupled to the first qubit; at least one intra-cell coupling region is disposed between the first and second coupling regions; and the long -range coupler passes around the at least one intra-cell coupling region without coupling to the first qubit at the intra-cell coupling region, the long-range coupler communicatively coupling the first and second coupling regions.

7. A quantum processor according to claim 3 wherein the long-range coupler does not extend across the respective crossing region of any one of the plurality of intra-cell couplers.

8. A quantum processor according to claim 3 wherein: the first cell comprises an array of qubits, with the qubits of the first qubit subset extending substantially parallel to a first major axis and the qubits of the second qubit subset extending substantially parallel to a second major axis substantially orthogonal to the first major axis; each of the first and second qubit subsets comprise at least four qubits; the first qubit extends parallel to the major axis of the first qubit for a qubit length distance; and the long-range coupling region extends parallel to the major axis of the first qubit for a coupling length distance which is at least half the qubit length distance.

9. A quantum processor according to claim 7 wherein each of the first and second qubit subsets comprise at least six qubits and the coupling length distance is at least two-thirds the qubit length distance.

10. A quantum processor according to claim 3 wherein the first cell comprises one or more intra-subset couplers, each intra-subset coupler providing controllable communicative coupling between at least two qubits of the first qubit subset which do not share a crossing region.

11. A quantum processor according to claim 10 wherein the one or more intra-subset couplers are disposed proximate to an outer boundary of the first cell.

12. A quantum processor according to claim 1 wherein:
the long-range coupler is one of one or more long-range couplers;
the first and second cells are each one of one or more long-range cells, each of the one or more long-range cells has a respective long-range qubit coupled to at least one of the one or more long-range couplers; and
the plurality of cells comprises one or more local cells, no qubit of the one or more local cells directly coupling to any of the one or more long-range couplers.

13. A quantum processor according to claim 12 wherein the one or more long-range couplers comprise at least two long-range couplers and the at least two long-range couplers couple a plurality of qubits of the first cell to a plurality of qubits of the second cell.

14. A quantum processor according to claim 12 wherein each cell of the one or more local cells has a greater number of intra-cell couplers than each of the long-range cells.

15. A quantum processor according to claim 12 wherein: each pair of the plurality of cells has a corresponding coupling distance based on a number of couplers needed to form a coupling between the pair; each of the one or more local cells is no more than a threshold coupling distance from one of the one or more long-range cells.

16. A quantum processor according to claim 15 wherein: the one or more local cells comprise a first local cell adjacent to the first cell and a second local cell adjacent to the second cell; the first and second local cells have a corresponding inter-cell coupling distance based on a number of inter-cell couplers needed to form a coupling between the first and second local cells without the use of any of the one or more long-range couplers; and the inter-cell coupling distance is greater than the coupling distance corresponding to the first and second local cells, said coupling distance based at least partially on the provision of the one or more long-range couplers.

17. A quantum processor according to claim 15 wherein the one or more long-range cells comprise a plurality of long-range subsets of cells, each cell of each long-range subset coupled to each other cell of the same long-range subset via the one or more long-range couplers without the use of the one or more inter-cell couplers.

18. A quantum processor according to claim 17 wherein: each long-range subset has a corresponding covering density value and a corresponding covering region comprising one or more local cells; and for each long-range subset, each of the one or more local cells in the covering region has a coupling distance no greater than the covering density value with at least one cell of the long-range subset.

19. A quantum processor according to claim 18 wherein each of the plurality of long-range subsets have the same corresponding covering density value.

20. A quantum processor according to claim 18 wherein, for each long-range subset, each of the one or more long-range cells of each other long-range subset in the covering region has a coupling distance no greater than the covering density value with at least one cell of the long-range subset.

21. A quantum processor according to claim 18 wherein, for each long-range subset, the covering region comprises each cell of the plurality of cells which is not on a perimeter of the plurality of cells.

22. A quantum processor according to claim 18 wherein each long-range subset has the same corresponding covering region and each of the one or more local cells in the covering region is adjacent to at least one of the one or more long-range cells.

23. A quantum processor according to claim 18 wherein a first long-range subset and a second long-range subset overlap, so that at least one of the plurality of cells is contained by both the covering region of the first long-range subset and the covering region of the second long-range subset.

24. A quantum processor according to claim 17 wherein: the plurality of cells comprises a substantially two-dimensional array of cells arranging the plurality of cells into rows and columns along first and second array axes, adjacent cells being adjacent in the array; and each long-range subset comprises a two-dimensional sub-array of long-range cells.

25. A quantum processor according to claim 24 wherein: the array comprises a first dimension of at least a first number of cells along the first array axis; and at least one sub-array of long-range cells comprises a second dimension of no more than a second number of cells along the first array axis, the second number no more than half the first number.

26. A quantum processor according to claim 1 wherein each qubit in the one or more qubits comprises a qubit loop formed by a closed superconducting current path and a compound Josephson junction that interrupts the qubit loop.

27. A method of controllably coupling qubits in a quantum processor, the quantum processor comprising a plurality of cells each comprising one or more qubits, the methods comprising:
controllably communicatively coupling a first inter-cell coupling qubit of a first cell to a second inter-cell coupling qubit of another cell via one or more inter-cell couplers, whereby direct coupling by the inter-cell couplers defines an adjacency relationship between the cells of the first and second inter-cell coupling qubits;
controllably communicatively coupling a first qubit of the first cell and a second qubit of a second cell via a long-range coupler, the second cell non-adjacent to the first cell;
wherein coupling via each inter-cell coupler of the one or more inter-cell couplers comprises directly coupling over at most a threshold inter-cell physical coupling distance; and
coupling via the long-range coupler comprises directly coupling over at least a threshold long-range physical coupling distance, the lone-range physical coupling distance greater than the inter-cell physical coupling distance;
coupling each of the one or more inter-cell couplers of the first cell to the respective first inter-cell coupling qubit at one or more inter-cell coupling regions, each inter-cell coupling region having at most an inter-cell coupling area;
coupling the long-range coupler to the first qubit over a long-range coupling region having at least a long-range coupling area, the long-range coupling area greater than the inter-cell coupling area; and
coupling the first and second qubits via the long-range coupler without coupling the first qubit to any qubits of intervening cells disposed between the first and second cells via the long-range coupler.

28. A method according to claim 27 wherein the method comprises:
controllably communicatively coupling at least two qubits of the first cell via one or more intra-cell couplers;
coupling a first intra-cell coupling qubit of a first qubit subset of the one or more qubits and a second intra-cell coupling qubit of a second qubit subset of the one or more qubits at an intra-cell coupling region proximate to a crossing region where the first intra-cell coupling qubit crosses the second intra-cell coupling qubit; and
coupling the long-range coupler to the first qubit over a long-range coupling region, the long-range coupling region extending across at least a part of each of a plurality of crossing regions of the first qubit.

29. A method according to claim 28 wherein the long-range coupling region does not extend across any respective crossing regions of the plurality of intra-cell couplers.

30. A method according to claim 29, the method comprising: coupling each qubit of the first qubit subset to at least one qubit of the second qubit subset via the plurality of intra-cell couplers; and coupling each qubit of the second qubit subset to at least one qubit of the first qubit subset via the plurality of intra-cell couplers.

31. A method according to claim 29 wherein the long-range coupling region comprises a first coupling region and a second coupling and coupling the long-range coupler to the first qubit over a long-range coupling region comprises: communicatively coupling the first and second coupling regions by a portion of the long-range coupler which passes around the at least one intra-cell coupling region without coupling to the first qubit at an intra-cell coupling region; wherein at least one intra-cell coupling region is disposed between the first and second coupling regions.

32. A method according to claim 28, the method comprising coupling at least two qubits of the first qubit subset which do not share a crossing region via one or more intra-subset couplers.

33. A method according to claim 27 wherein the long-range coupler is one of one or more long-range couplers, the first and second cells are each one, of one or more long-range cells, and the plurality of cells, comprise one or more local cells, the method further comprising coupling a respective long-range qubit of each of the one or more long-range cells to at least one of the one or more long-range couplers and only coupling the one or more long-range couplers to qubits not in local cells.

34. A method according to claim 33 wherein each cell of the one or more local cells has a greater number of intra-cell couplers than each of the long-range cells.

* * * * *